(12) United States Patent  (10) Patent No.: US 6,243,238 B1
Kabasawa  (45) Date of Patent: Jun. 5, 2001

(54) SHOCK-RESISTANT RECORDING/ REPRODUCING DEVICE

(75) Inventor: Hidetoshi Kabasawa, Saitama-Ken (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/257,073

(22) Filed: Feb. 24, 1999

(30) Foreign Application Priority Data

Feb. 26, 1998 (JP) .................................................. 10-045717

(51) Int. Cl.$^7$ ....................................................... G11B 5/54
(52) U.S. Cl. ..................................... 360/256.3; 360/256.4
(58) Field of Search ................................ 360/105, 99.02, 360/99.03, 99.06, 99.07, 256–260

(56) References Cited

U.S. PATENT DOCUMENTS

| 4,987,506 |   | 1/1991  | Uehara .              |
|-----------|---|---------|-----------------------|
| 5,060,101 | * | 10/1991 | Isomura ..... 360/99.06 |
| 5,241,529 | * | 8/1993  | Hara ......... 360/99.06 |
| 5,278,819 | * | 1/1994  | Shimegi .... 360/99.06 |
| 5,650,891 | * | 7/1997  | Thayne ...... 360/99.06 |
| 5,768,241 | * | 6/1998  | Kanazawa .. 360/99.06 |
| 5,815,470 | * | 9/1998  | Ohmori ..... 360/99.07 |
| 5,862,116 | * | 1/1999  | Watanabe .. 360/99.06 |
| 6,018,433 | * | 1/2000  | Thayne ...... 360/99.06 |

FOREIGN PATENT DOCUMENTS 5-109209   4/1993  (JP) .
10-40658   2/1998  (JP) .

* cited by examiner

Primary Examiner—A. J. Heinz
(74) Attorney, Agent, or Firm—Anderson, Kill & Olick P.C.

(57) ABSTRACT

A head carriage supports a head. A locking member is movable between an engagement position at which the locking member engages with an engagement portion of the head carriage and a disengagement position at which the locking member disengages with the engagement portion of the head carriage. A driving unit stops driving one end of a first link in each of an ejecting mode in which a recording medium is ejected from the device and a waiting condition in a recording/reproducing mode, in which condition the head is not in contact with the recording medium. One end of a second link is connected with the other end of the first link, and the other end of the second link is connected with the locking member. A force-applying member applies force to the locking member so as to cause the locking member to move to the engagement position. When the driving unit drives the one end of the first link, the first link and the second link rotate so as to cause the locking member to move to the disengagement position, and, when the driving unit stops driving the one end of the first link, the force applied by the force-applying member causes the locking member to move to the engagement position.

6 Claims, 15 Drawing Sheets

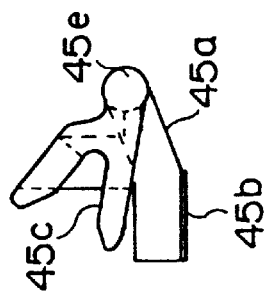
FIG. 5E
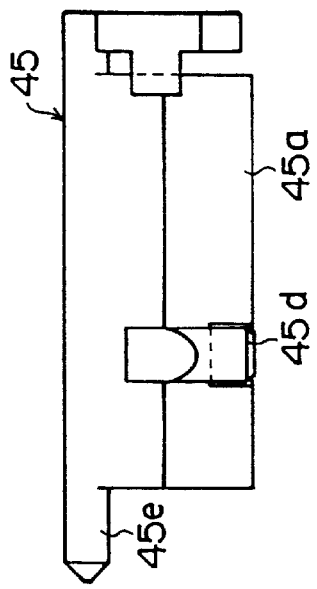
FIG. 5A
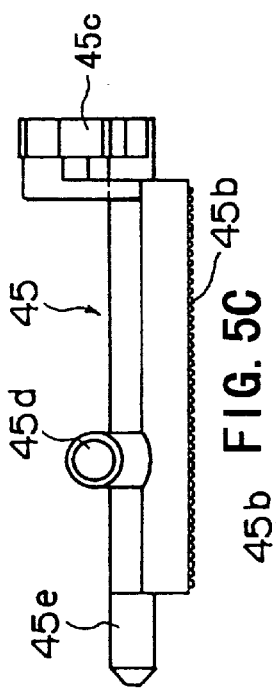
FIG. 5B
FIG. 5C
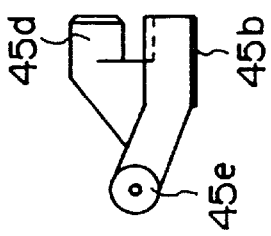
FIG. 5D

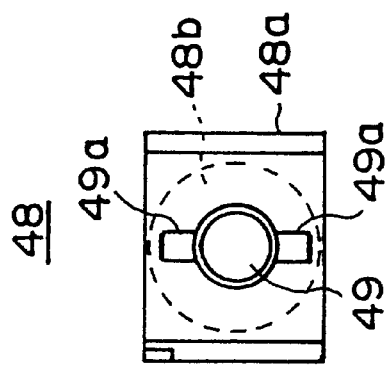
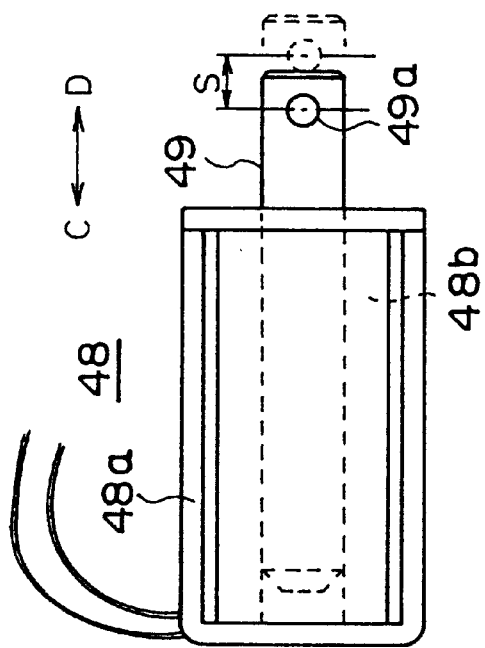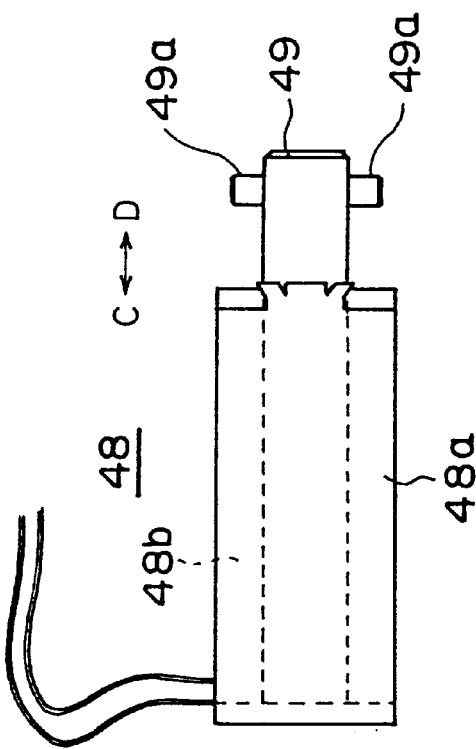

SHOCK-RESISTANT RECORDING/REPRODUCING DEVICE

BACKGROUND OF THE INVENTION

1. Field of the Invention

The present invention relates to a recording-medium recording/reproducing device, and, in particular, to a recording-medium recording/reproducing device having a head moving mechanism which causes a head to approach a recording medium in response to movement of the recording medium, which movement is performed by a recording-medium moving mechanism.

2. Description of the Related Art

In an electronic apparatus such as a personal computer, a word processor or the like, a magnetic disk device, for example, is provided as means for recording information. In the magnetic disk device, when a disk cartridge as a recording-medium container is loaded, a magnetic disk contained in the disk cartridge is rotated, and a magnetic head slides on the magnetic disk so as to perform magnetic recording/reproducing.

The magnetic disk device has a recording-medium moving mechanism which includes a disk holder in which the disk cartridge is inserted, and a slider which performs a sliding operation in response to a disk-cartridge inserting operation and moves the disk holder from a cartridge insertion/ejection position to a cartridge loaded position.

Force is applied to the slider in one direction by a coil spring or the like. When the disk cartridge is inserted, a latch lever is pushed by an end of the disk cartridge so as to rotate, and, thereby, prevention of movement of the slider by the latch lever is released. As a result, the slider slides in the direction in which the force is applied thereto, and moves the disk holder to the cartridge loaded position. At this time, as a result of the disk holder falling from the cartridge insertion/ejection position to the cartridge loaded position, the disk in the disk cartridge is chucked onto a turntable.

In order to positively perform this loading operation performed by the disk holder, the force of the spring to be applied to the slider is set to be strong. The slider is accelerated by the spring force during a time starting when the disk cartridge is inserted into the disk holder and ending when the disk cartridge is loaded, and, then, the slider slides at an approximately fixed speed. Therefore, at a time when the slider reaches a sliding completion position, the magnetic head comes into contact with the magnetic disk so strongly that a magnetic film on the surface of the magnetic disk may be damaged.

In order to eliminate such a problem, in the device in the related art, a damper for decelerating the slider is provided. An oil damper is used as such a damper. The oil damper includes a gear engaging with a rack provided on the slider, a rotating body which rotates together with the gear, and a container which is filled with grease and contains the rotating body. In this oil damper, when the rotating body provided in the container rotates as a result of the slider sliding, the rotating body is decelerated due to viscosity resistance of the grease provided in the container, and the slider is decelerated.

However, in the above-described disk device in the related art, the viscosity of the grease provided in the container depends on the temperature. That is, when the temperature is low, the viscosity resistance of the grease is so large that it is not possible to positively perform the loading operation of the magnetic disk. Further, when the temperature is high, because the viscosity resistance of the grease is small, the loading operation is performed so strongly that the magnetic film of the magnetic disk may be damaged.

Further, in the magnetic disk device, achievement of high-density recording has been attempted as a result of the rotation speed of the magnetic disk being increased, and, thus, the storage capacity of the magnetic disk has been increased. In such a type of a magnetic disk device, buoyant force, caused by an air flow generated due to high-speed rotation of the magnetic disk, is applied to the magnetic head. Thereby, magnetic recording/reproducing can be performed in a condition in which the magnetic head slightly floats above the magnetic disk so that the surface of the magnetic disk is not damaged.

However, in a condition in which the magnetic disk rotates at low speed, no sufficient buoyant force is applied to the magnetic head. Therefore, when the magnetic head is caused to approach the magnetic disk in the condition in which the magnetic disk rotates at low speed, the magnetic head comes into contact with the magnetic disk, and, as a result, a possibility that the magnetic film formed on the surface of the magnetic disk is damaged is high.

Further, in an ejecting condition in which the magnetic disk is ejected from the magnetic disk device or in a waiting condition in which the magnetic head is positioned away from the magnetic disk, the head carriage which supports the magnetic head is locked and the magnetic head is prevented from coming into contact with the magnetic disk so that the magnetic disk is prevented from being damaged.

SUMMARY OF THE INVENTION

An object of the present invention is to provide a recording-medium recording/reproducing device in which the above-mentioned problems are solved.

A recording-medium recording/reproducing device, according to the present invention, comprises:

a head carriage which supports a head;

a locking member which is movable between an engagement position at which the locking member engages with an engagement portion of the head carriage and a disengagement position at which the locking member disengages with the engagement portion of the head carriage;

a first link;

a driving unit which stops driving one end of the first link in each of an ejecting mode in which a recording medium is ejected from the device and a waiting condition in a recording/reproducing mode, in which condition the head is not in contact with the recording medium;

a second link, one end of which is connected with the other end of the first link, and the other end of which is connected with the locking member; and a force-applying member which applies force to the locking member so as to cause the locking member to move to the engagement position, wherein, when the driving unit drives the one end of the first link, the first link and the second link rotate so as to cause the locking member to move to the disengagement position, and, when the driving unit stops driving the one end of the first link, the force applied by the force-applying member causes the locking member to move to the engagement position.

Accordingly, in the present invention, when the driving unit drives the one end of the first link, the first link and the second link rotate so as to cause the locking member to move to the disengagement position, and, when the driving unit stops driving the one end of the first link, the force applied by the force-applying member causes the locking member to move to the engagement position. Thereby, in the condition other than the condition in which the head is used for performing recording/reproducing, that is, in the condition other than the condition in which the seeking operation is performed in the recording/reproducing mode, the head cannot move, and, thereby, the head is prevented from freely moving when external vibration is applied to the device in each of the ejecting mode and the waiting condition in the recording/reproducing mode. Further, in a case where the device is transported or the like in which vibration is applied to the device, the recording medium is prevented from being damaged due to movement of the head. Furthermore, because the movement of the one end of the first link driven by the driving unit is converted into rotations of the first link and the second link, and causes the locking member to move, merely a small amount of movement of the one end of the first link is needed. As a result, it is possible use a compact driving unit.

Other objects and further features of the present invention will become more apparent from the following detailed description when read in conjunction with the accompanying drawings.

BRIEF DESCRIPTIONS OF DRAWINGS

FIGS. 5A, 5B, 5C, 5D and 5E show a structure of a carriage stopper;

FIGS. 10A, 10B and 10C show an arrangement of a solenoid;

DETAILED DESCRIPTION OF THE PREFERRED EMBODIMENT

One embodiment of a recording-medium recording/reproducing device according to the present invention will now be described with reference to drawings.

Figure 1:
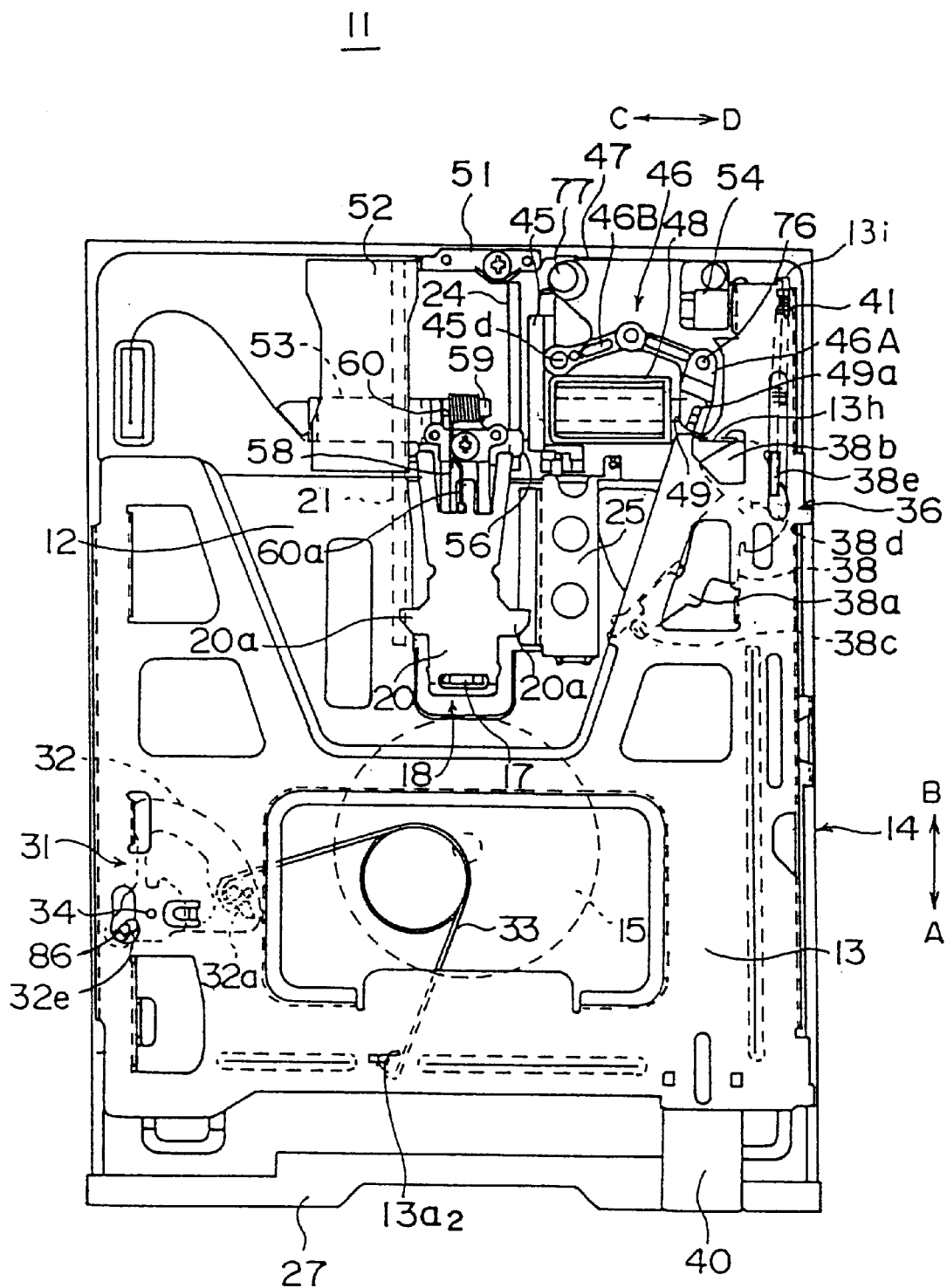
FIG. 1 shows a plan view showing a magnetic disk device in one embodiment of a recording-medium recording/reproducing device according to the present invention.
Figure 2:
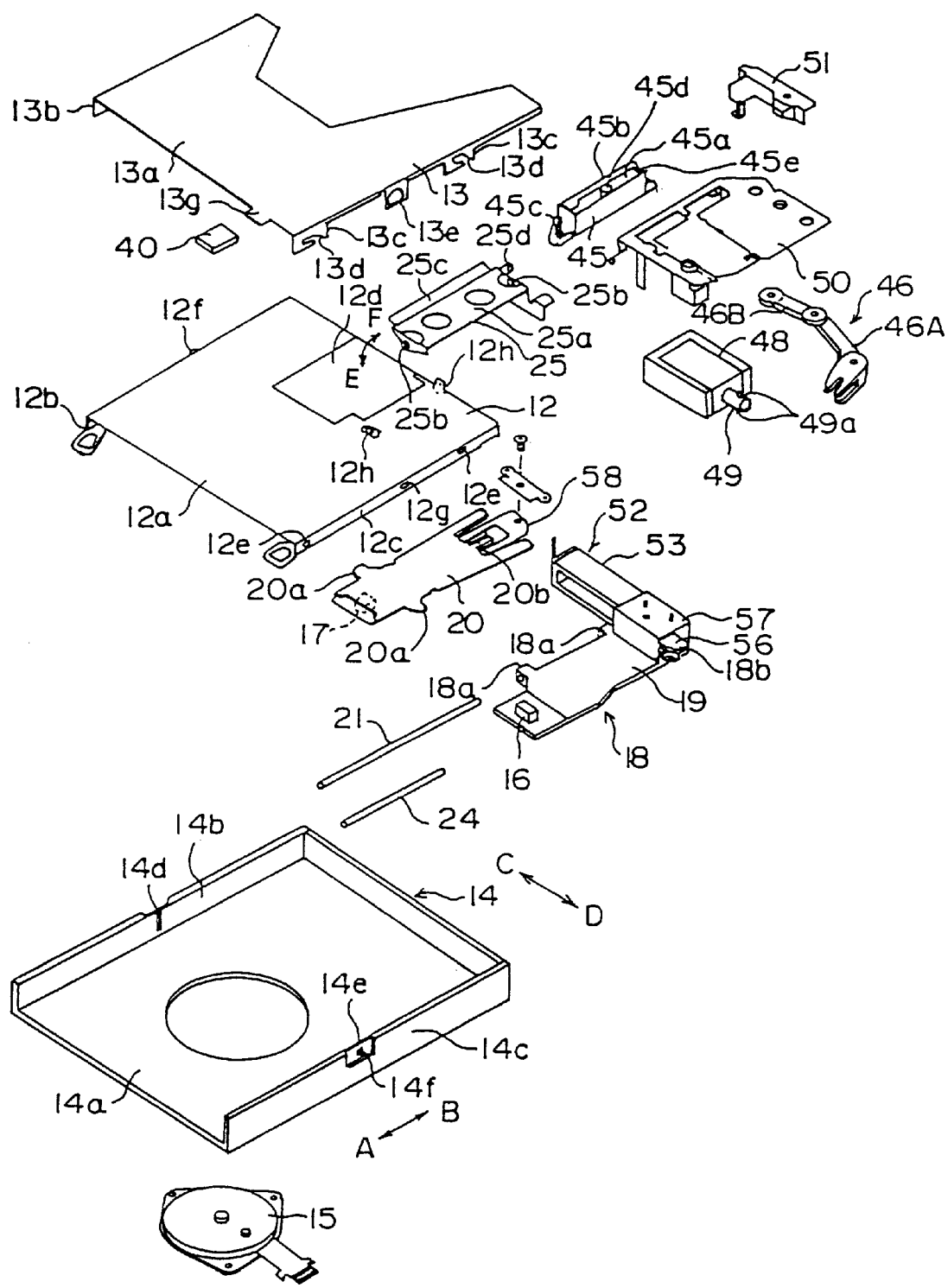
FIG. 2 shows an exploded perspective view showing a general arrangement of the magnetic disk device.

FIG. 1 shows a plan view of a magnetic disk device 11 in one embodiment of the recording-medium recording/reproducing device according to the present invention. FIG. 2 shows an exploded perspective view showing a general arrangement of the magnetic disk device 11.

As shown in FIGS. 1 and 2, in the magnetic disk device 1, a disk holder 12, in which a disk cartridge (not shown in the figures) is inserted, and a slider 13, which slides forward and backward so as to raise and lower the disk holder 12, are mounted on a frame 14. The slider 13 is provided on the frame 14 slidably in A, B directions, and, in response to the operation of inserting the disk-cartridge, the slider 13 slides in the A direction so as to lower the disk holder 12 from a cartridge insertion/ejection position to a cartridge loaded position.

A turntable 15, which is driven by a disk motor (not shown in the figure) for rotating a magnetic disk, and a head carriage 18, which supports magnetic heads 16, 17, are provided so as to project from the surface 14a of the frame 14. A circuit substrate (not shown in the figures) having a control circuit is mounted on the underside of the frame 14.

The head carriage 18 has a carriage body 19 which supports the lower magnetic head 16 on a top surface of an extending end thereof, and a head arm 20 which supports the upper magnetic head 17 on a bottom surface of an extending end thereof and is rotatably mounted on the carriage body 19.

The head carriage 18 is guided by guiding shafts 21, 24 which extend in the forward/backward directions (A, B directions) so as to be movable in the forward/backward directions. Bearing portions 18a, 18b, into which the guiding shafts 21, 24 are slidably fitted, respectively, are provided on the right and left side surfaces of the head carriage 18, respectively.

The bearing portion 18a includes a circular hole through which the main guiding shaft 21 passes, and is a main bearing which determines the movement directions, the horizontal position and the vertical position of the head carriage 18. Further, the bearing portion 18b is a bearing having an angular-'C' shape, into which the guiding shaft 24 is fitted. Therefore, the bearing portion 18b does not determine the movement directions and horizontal position of the head carriage 18, but determines only the vertical position of the head carriage 18.

The head carriage 18 is guided by the guiding shafts 21 and 24 and moves in the A, B directions as a result of being driven by a voice coil motor (which will be described later). As a result, the magnetic heads 16, 17 supported by the head carriage 18 are in close proximity to desired tracks of the magnetic disk (not shown in the figures) contained in the disk cartridge. Thus, magnetic recording/reproducing is performed through the magnetic heads 16, 17.

A damper mechanism 31 is arranged on the underside of the slider 13. The damper mechanism 31 includes a damper plate 32 rotatably provided on the underside of the slider 13, and a torsion spring 33 which applies force to the damper plate 32. On the underside of the slider 13, a shaft 34, which rotatably supports the damper plate 32, and a hooking portion 13a$_2$, to which one end of the torsion spring 33 is hooked, are provided. A long hole 32e, into which a pin 86 fixed on the frame 14 is fitted, is formed in the damper plate 32.

The damper plate 32 is rotatably supported by the shaft 34, which projects downward from a top plate 13a of the slider 13. When the slider 13 slides in the A, B directions, the relative positions of the pin 86 fixed on the frame 14 and the shaft 34 of the slider 13 change, and, thus, the sliding operation of the slider 13 is decelerated, as will be described later.

Thus, the damper mechanism 31 in the embodiment of the present invention is not an oil damper but is a mechanical damper mechanism using spring force to be applied to the slider 13 for decelerating the sliding operation of the slider 13.

Further, the damper mechanism 31 is arranged so that the damper mechanism 31 applies force to the slider 13 in the direction (B direction) reverse to the direction (A direction) in which the slider 13 moves, at the beginning of the movement thereof from the cartridge insertion/ejection position to the cartridge loaded position, and, then, after the damper plate 32 rotates a predetermined angle in the process in which the slider 13 slides, the damper mechanism 31 applies force to the slider 13 in the direction (A direction) in which the slider 13 moves.

Thereby, at the beginning of the disk-cartridge loading operation, the damper mechanism 31 decelerates the operation of the slider through the spring force of the torsion spring 33, and, thus, reduces the speed at which the disk holder 12 falls, that is, reduces the disk loading speed. Further, before the disk cartridge reaches the cartridge loaded position together with the disk holder 12, the direction in which the torsion spring 33 of the damper mechanism 31 applies the force to the slider 13 is reversed due to rotation of the damper plate 32 so that the damper mechanism 31 applies the force to the slider 13 in the loading direction (A direction), and, thereby, holds the disk holder 12 in the cartridge loaded position after the disk cartridge reaches the cartridge loaded position.

Arrangements of the respective main components arranged as described above will now be described.

The disk holder 12 includes a top plate 12a, and cartridge guiding portions 12b, 12c which bend at both sides of the top plate 12a so as to hold the disk cartridge from both sides. Thus, the space enclosed by the top plate 12a and the cartridge guiding portions 12b, 12c of both sides is a cartridge inserting portion.

An opening 12d, in which the head carriage 18 moves, is provided in the top plate 12a of the disk holder 12. Further, a lifter 25, which comes into contact with a projection 20a projecting from one side of the head arm 20, is rotatably provided on the right side of the opening 12d. Thereby, the magnetic head 17 of the head arm 20 is lifted and lowered intermittently in response to the rising and falling operations of the disk holder 12. Thus, a head moving mechanism is formed by the disk holder 12, the head arm 20, the lifter 25 and so forth.

The lifter 25 is supported on the disk holder 12 as a result of shafts 25b projecting from both sides of a body 25a of the lifter 25 being supported by supporting portions 12h which stand on the top plate 12a of the disk holder 12. Thus, the lifter 25 can rotate in the E, F directions perpendicular to the carriage moving directions (A, B directions).

Further, on each of both sides of the disk holder 12, a pair of engagement pins 12e which engage with the slider 13 are provided. From the centers of both sides of the disk holder 12, guiding portions 12f, 12g project, respectively. The guiding portions 12f, 12g are fitted into guiding cut-out portions 14d, 14e provided in side walls 14b, 14c of the frame 14, and, thereby, the rising and falling operations of the disk holder 12 are guided.

As will be described later, in response to the rising and falling operations of the disk holder 12, a contact portion 25c of the lifter 25 provided on the top plate 12a of the disk holder 12 comes into contact with the projection 20a of the head arm 20, and the lifter 25 rotates so as to lower the head arm 20 stepwise. The contact portion 25c extends through the length corresponding to the length from the most inside track to the most outside track of the magnetic disk, that is, the length corresponding to the stroke of the head carriage 18.

The slider 13 is slidably mounted above the disk holder 12. The slider 13 includes a J-shaped plane plate (top plate) 13a, side portions 13b, 13c which bend downward from both sides of the plane plate 13a, inclined cut-out portions 13d which are provided in the side portions 13b, 13c and into which the engagement pins 12e of the disk holder 12 are fitted, respectively, and engagement holes 13e which engage with projections 14f projecting from the centers of both side surfaces of the frame 14, respectively. Further, the slider 13 includes a projection 13g which projects from the right side of the front end of the slider 13. An ejecting button 40 is fixed to the projection 13g. Further, a force is applied to the slider 13 in the A direction by a coil spring 41.

Figure 3:
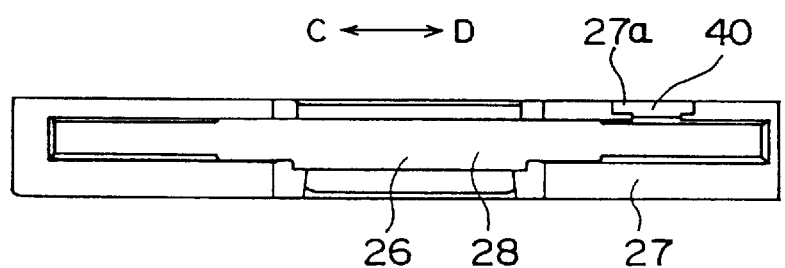
FIG. 3 shows a front elevational view of the magnetic disk device.

FIG. 3 shows a front elevational view of the magnetic disk device 11.

As shown in FIG. 3, a front bezel 27 having a disk inserting hole 26 is mounted on the front end of the frame 14. On the right side of a top end portion of the bezel 27, a recess portion 27a into which the ejecting button 40 is slidably fitted is provided. On the rear side of the bezel 27, a flap 28 for covering the disk inserting hole 26 from the inside is mounted rotatably in opening and closing directions.

Figure 4:
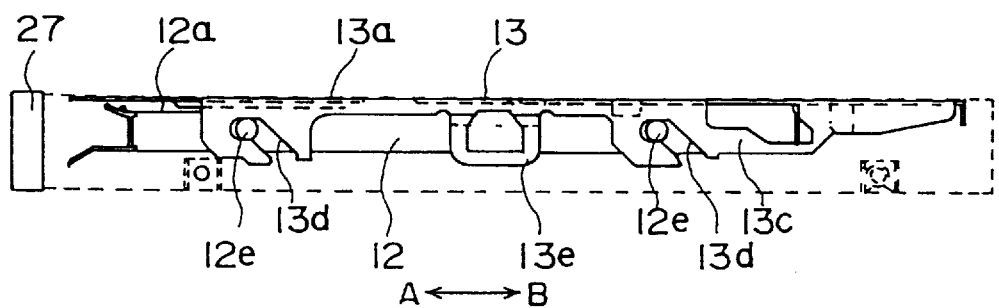
FIG. 4 shows a side elevational view showing a condition in which the disk holder and the slider are combined.

FIG. 4 shows a side elevational view showing a condition in which the disk holder 12 and the slider 13 are combined with one another.

As shown in FIG. 4, the engagement pins 12e of the disk holder 12 are fitted into the inclined cutout portions 13d of the slider 13. Thereby, in response to the sliding operation of the slider 13, the engagement pins 12e are driven along the inclined cutout portions 13d. Thereby, when the slider 13 slides in the B direction, the disk holder 12 rises to the cartridge insertion/ejection position. When the slider 13 slides in the A direction, the disk holder 12 falls to the cartridge loaded position. Thus, a recording-medium conveying mechanism is formed by the disk holder 12 and the slider 13.

With reference to FIG. 1, a latch mechanism 36 includes a latch lever 38 which is rotatably supported on the top surface of the top plate 12a of the disk holder 12, and the coil spring 41 which applies force to the latch lever 38 counter-clockwise.

The latch lever 38 includes a lever portion 38a, acting as a to-be-pushed portion which is pushed by the disk cartridge which is inserted into the disk holder 12, and a movement-preventing portion 38b, which prevents the slider 13 from moving in the cartridge loading direction (A direction). The lever portion 38a rotates in response to the insertion and ejection of the disk cartridge, and opens and closes a shutter of the disk cartridge. An opening (not shown in FIG. 2) is provided in the top plate 12a of the disk holder. Through the opening, the lever portion 38a of the latch lever 38 projects inside the disk holder 12 so that the lever portion 38a can be pushed by the disk cartridge inserted into the disk holder 12.

One end of the coil spring 41 is fixed to a fixing hole 38e of the latch lever 38 and the other end of the coil spring 41 is fixed to a fixing portion 13i of the slider 13. As a result, the coil spring 41 applies force to the latch lever 38 by which the latch lever 38 rotates counterclockwise to be in a position such as to prevent movement of the slider 13, and applies force to the slider 13 by which the slider 13 moves in the cartridge loading direction (A direction).

Thus, the coil spring 41 acts as a slider returning spring for applying force to the slider 13 in the A direction, and, also, acts as a latch-lever returning spring for applying force to the latch lever 38 counterclockwise. As a result, in comparison to a case where a member which applies force to the latch lever 38 and a member which applies force to the slider 13 are provided separately, the assembly work can be simplified, work efficiency can be improved, and the manufacturing cost can be reduced.

In response to insertion of the disk cartridge into the disk holder 12, the latch lever 38 rotates clockwise as a result of being pushed by the front end of the disk cartridge. Then, when the arc-shaped movement-preventing portion 38b of the latch lever 38 separates from a movement-to-be-prevented portion 13h of the slider 13 as a result of the clockwise rotation of the latch lever 38, the slider 13, to which force is applied by the coil spring 41, slides in the A direction.

As a result of the latch lever 38 thus rotating, a projecting end portion 38c of the lever portion 38a pushes the shutter of the disk cartridge in the opening direction. Thereby, the magnetic heads 16, 17 can be in close proximity to the magnetic disk. When the ejecting button 40 is pressed in the B direction, and, thereby, the slider 13 slides in the same direction, movement prevention of the movement-preventing portion 38b, which movement prevention has been provided as a result of being in contact with a side surface of the movement-to-be-prevented portion 13h of the slider 13, is released. Thereby, the latch lever 38 rotates counterclockwise by the spring force of the coil spring 41.

As will be described later, a carriage stopper 45 acts as a locking member which prevents movement of the head carriage 18 at the time of ejection and in a waiting condition so as to prevent the magnetic heads 16, 17 from moving. A body 45a of the carriage stopper 45 is mounted so as to extend in the A, B directions so as to face the right side of the guiding shaft 24. The carriage stopper 45 is supported, by a bearing portion (not shown in the figure) formed on the frame 14, rotatably in the E, F directions, similar to the lifter 25.

FIGS. 5A, 5B, 5C, 5D and 5E show a structure of the carriage stopper 45. The carriage stopper 45 includes a rack 45b which is provided on one-side surface of the body 45a and prevents the head carriage 18 from moving, and a V-shaped recess portion 45c with which an engagement pin 25d projecting from an end portion of the lifter 25 engages, a connection pin 45d which projects on a top portion of the other-side surface of the body 45a, and a shaft 45e about which the carriage stopper 45 rotates.

Further, as shown in FIG. 2, a movable rack 56 which faces the rack 45b is provided on the right-side surface of the head carriage 18. The rack 45b extends through the length corresponding to the length from the most inside track to the most outside track of the magnetic disk, that is, the length corresponding to the stroke of the head carriage 18. Therefore, when the carriage stopper 45 rotates in the E direction, the rack 45b engages with the movable rack 56, and, thus, the carriage stopper 45 locks the head carriage 18.

A link mechanism 46 is connected with the carriage stopper 45. In the link mechanism 46, a first link 46A and a second link 46B are rotatably connected with one another.

Figure 6B:
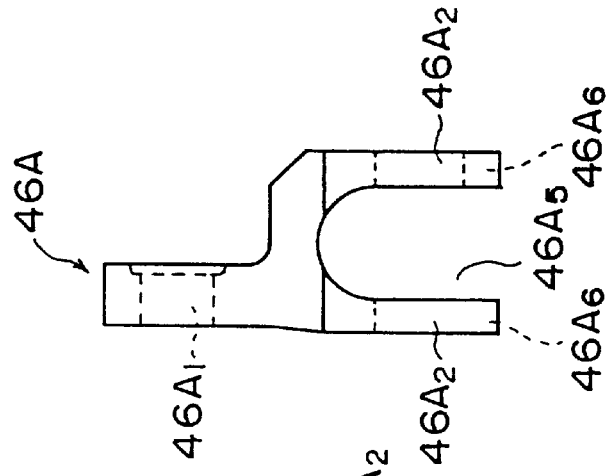
FIGS. 6A, 6B and 6C show a structure of a first link.
Figure 6A:
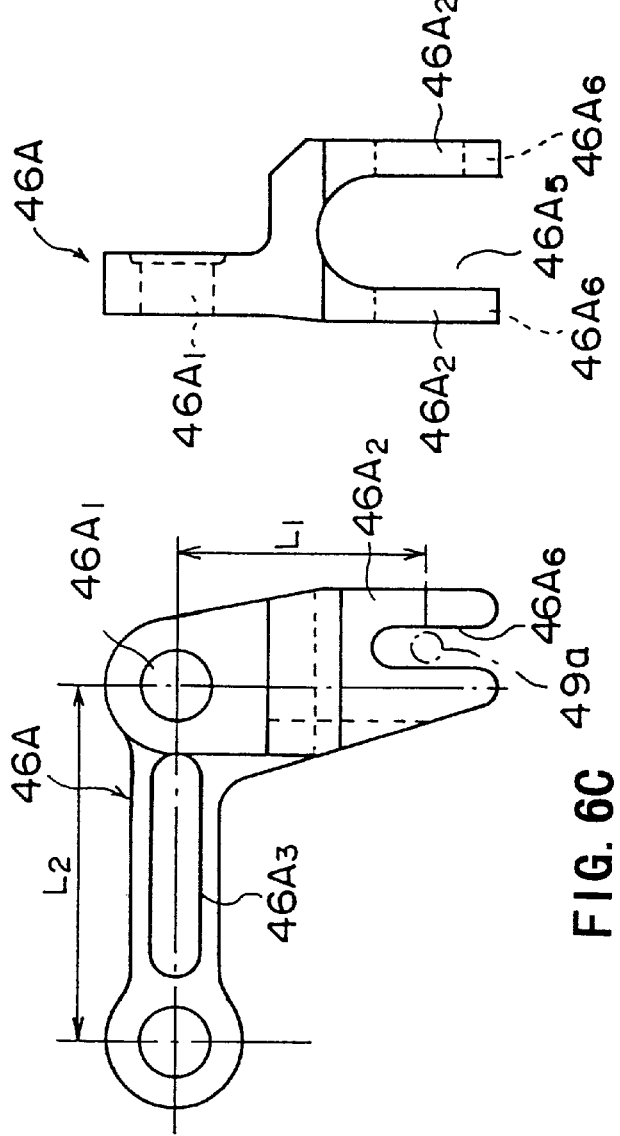
Figure 6C:
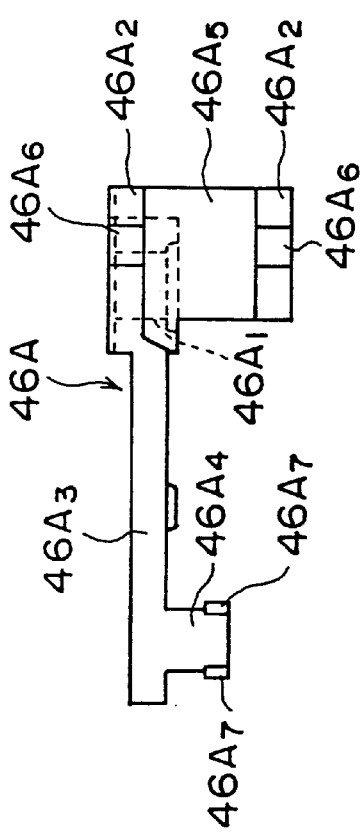

FIGS. 6A, 6B and 6C show a structure of the first link 46A.

As shown in FIGS. 6A, 6B and 6C, the first link 46A is formed to be L-shaped in the plan view (FIG. 6A). The first link 46A has a shaft hole $46A_1$. A shaft 76 (see FIG. 11) standing on the frame 14 is fitted into the shaft hole $46a_1$ so that the first link 46A is rotatably supported on the frame 14. The first link 46A further has an engagement arm $46A_2$ which engages with a plunger 49 of a solenoid 48 which will be described later. The first link 46A further has a connection arm $46A_3$ which extends in a direction perpendicular to the engagement arm $46A_2$, and a connection shaft $46A_4$ which is provided at an end portion of the connection arm $46A_3$ and is connected with the second link 46B.

Further, in the first link 46A, the distance $L_1$ between the center of the shaft hole $46A_1$ and the position at which the engagement arm $46A_2$ engages with the plunger 49 and the distance $L_2$ between the center of the shaft hole $46A_1$ and the center of the connection shaft $46A_4$ are set so that $L_1<L_2$. Thereby, when the first link 46A is rotated as a result of movement of the plunger 49, the connection shaft $46A_4$ moves a longer distance in comparison to the stroke of the plunger 49. Thereby, when the locking of the head carriage 18 is released, it is possible to move the carriage stopper 45 to a locking releasing position by the small stroke of the plunger 49.

The engagement arm $46A_2$ has a space $46A_5$ into which the plunger 49 is inserted, has a forked shape extending so as to face a top portion and a bottom portion of the plunger 49, and has engagement cut-out portions $46A_6$ with which engagement pins 49a projecting upward and downward from the plunger 49 engage. Further, at the bottom end of the connection shaft $46A_4$, separation-preventing claws $46A_7$ project in radial directions.

Figure 7A:
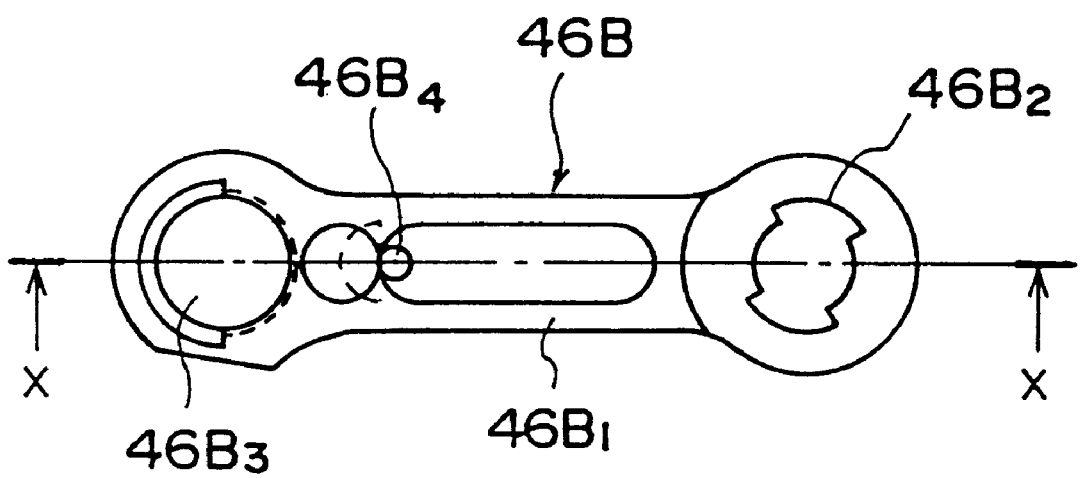
FIGS. 7A and 7B show a structure of a second link.
Figure 7B:
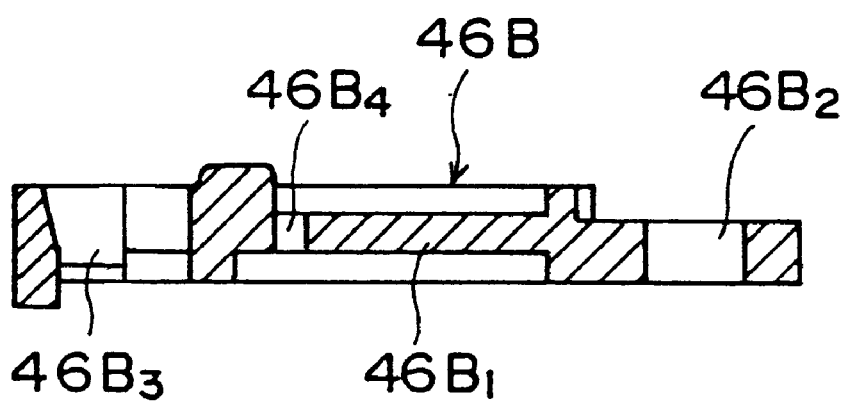

FIG. 7A shows a plan view of the second link 46B. FIG. 7B shows a side-elevational sectional view of the second link 46B.

As shown in FIGS. 7A, 7B, the second link 46B has a connection hole $46B_2$ at one end of a rod portion $46B_1$ extending straightly. The connection hole $46B_2$ is connected with the first link 46A. Further, the second link 46B has a fitting hole $46B_3$ at the other end of the rod portion $46B_1$. The connection pin 45d of the carriage stopper 45 is fitted into the fitting hole $46B_3$. Further, the second link 46B has a spring-hooking hole $46B_4$ provided in the proximity of the fitting hole $46B_3$. The connection hole $46B_2$ has a shape of a circle with a pair of sector escaping portions formed in the sidewall of the circular hole. The sector escaping portions have shapes corresponding to the projecting shapes of the separation-preventing claws $46A_7$ of the first link 46A.

Figure 8A:
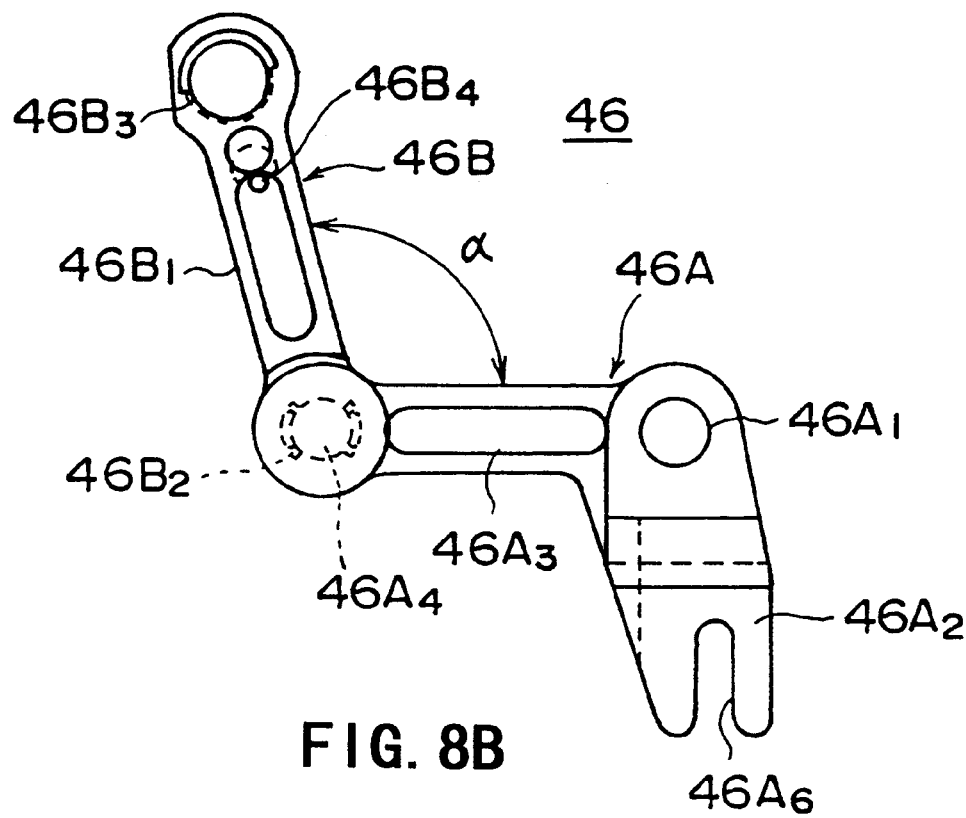
FIGS. 8A and 8B illustrates a process of connecting the first link with the second link.
Figure 8B:
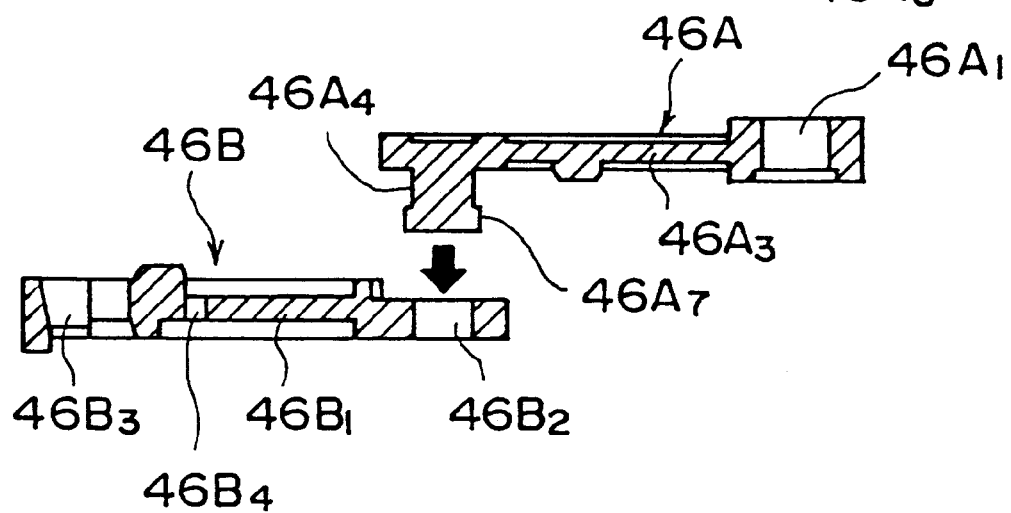

FIG. 8A shows a plan view illustrating a process of connecting the first link 46A with the second link 46B. FIG. 8B shows a side-elevational sectional view illustrating the process of connecting the first link 46A with the second link 46B.

As shown in FIGS. 8A, 8B, when the first link 46A and the second link 46B are connected with one another, the connection shaft $46A_4$ of the first link 46A is fitted into the connection hole $46B_2$ of the second link 46B so that the separation-preventing claws $46A_7$ projecting at the bottom of the connection shaft $46A_4$ are aligned with the shape of the connection hole $46B_2$ in a condition in which the second link 46B has rotated by the angleo (approximately 100°)

with respect to the first link 46A. Then, as a result of rotating the first link 46A with respect to the second link 46B after the connection shaft 46A$_4$ is fitted into the connection hole 46B$_2$, the separation-preventing claws 46A$_7$ are prevented from separating from the connection hole 46B$_2$.

Figure 9A:
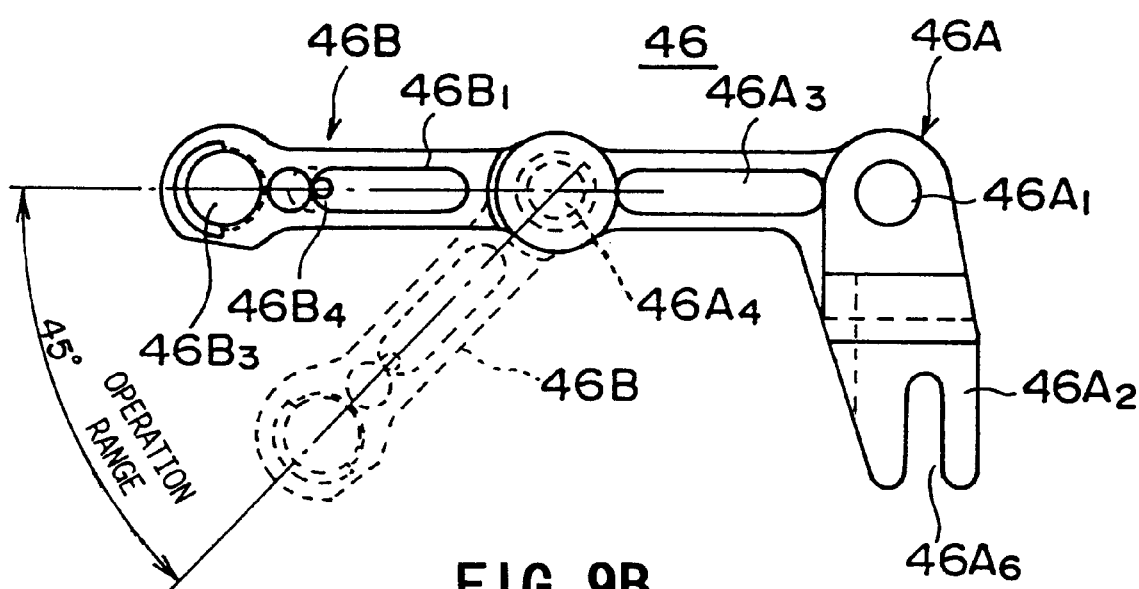
FIGS. 9A and 9B illustrate a condition in which the first link and the second link are connected with one another.
Figure 9B:
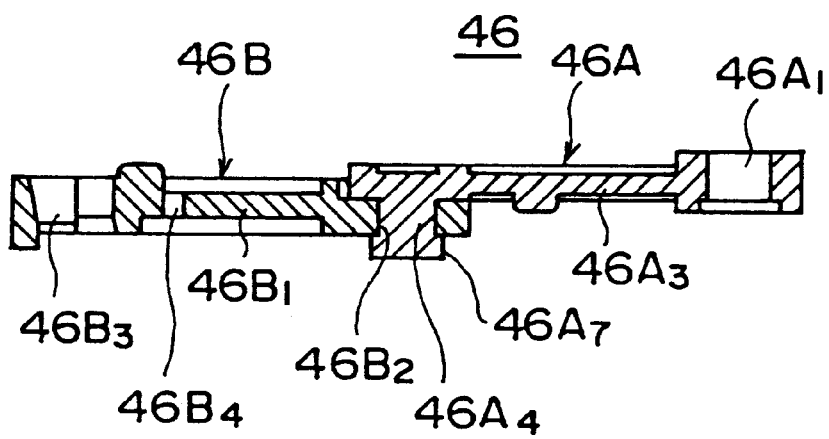

FIG. 9A shows a plan view illustrating a condition in which the first link 46A and the second link 46B are connected with one another. FIG. 9B shows a side-elevational sectional view illustrating the condition in which the first link 46A and the second link 46B are connected with one another.

As shown in FIGS. 9A, 9B, after the first link 46A and the second link 46B are connected with one another, the link mechanism 46 is assembled in the device so that rotation is possible in a range between a straightly extending condition in which the first link 46A and the second link 46B connected with one another extend straightly and a bent condition in which the second link 46B is in the position indicated by the broken lines in FIG. 9A.

Figure 11:
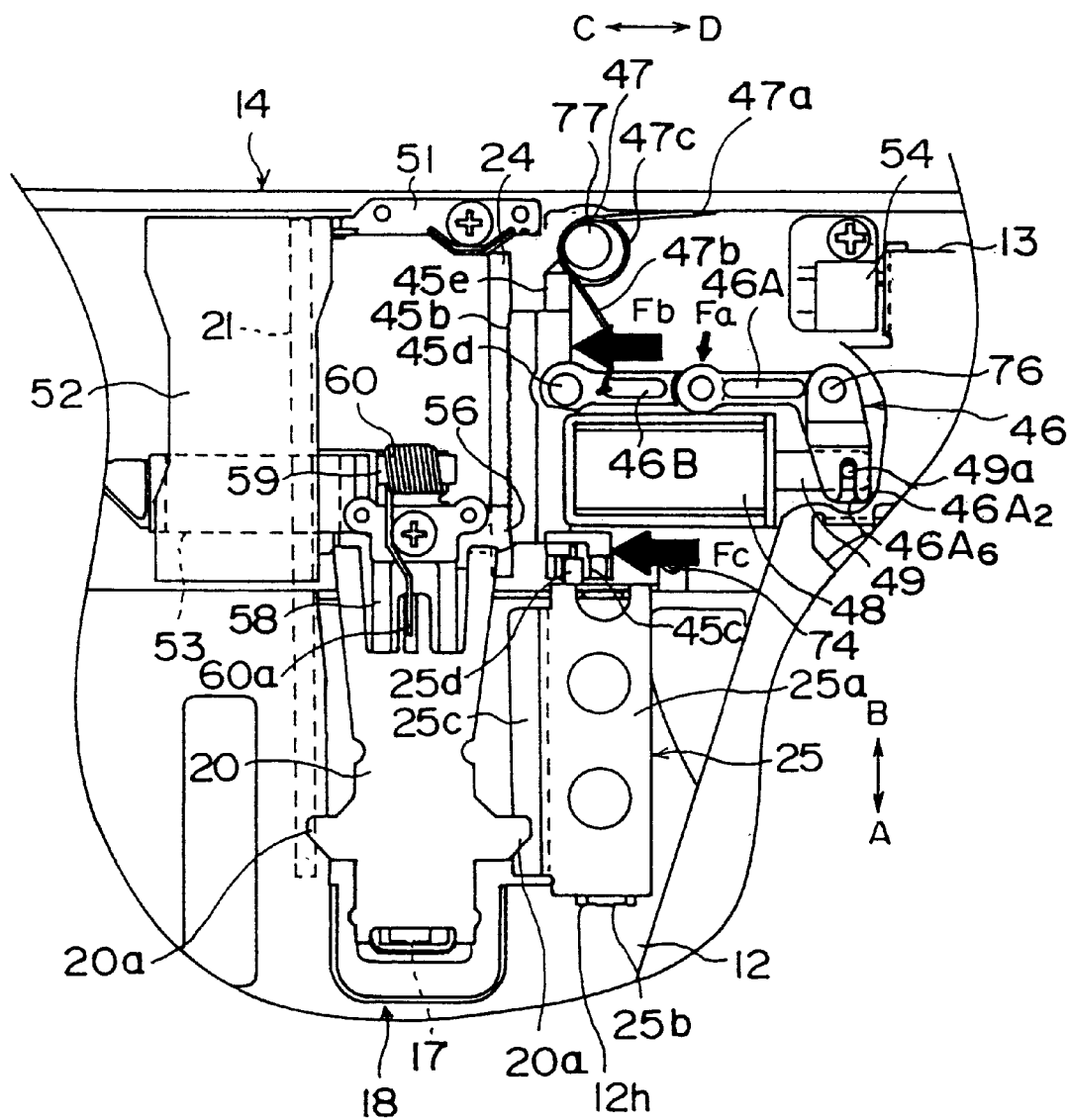
FIG. 11 shows a magnified plan view showing a head carriage and a periphery thereof in an ejecting mode.

Further, as shown in FIG. 11, spring force of a torsion spring (force-applying member) 47 is applied to the second link 46B so that the link mechanism 46 enters the straightly extending condition. One end 47a of the torsion spring 47 is hooked to a rear end portion of the frame 14, and the other end 47b of the torsion spring 47 is hooked to the spring-hooking hole 46B$_4$ of the second link 46B. As a result, the link mechanism 46 is maintained in the straightly extending condition by the spring force of the torsion spring 47, and, thereby, the link mechanism 46 pushes the carriage stopper 45 in the direction toward the head carriage 18.

The other end 47b of the torsion spring 47 is bent so that the torsion spring 47 pushes the spring-hooking hole 46B$_4$ in the direction toward the carriage stopper 45. A coil portion 47c of the torsion spring 47 is fitted around a cylindrical projecting pin 77 projecting on the frame 14.

FIG. 10A shows a plan view illustrating an arrangement of the solenoid 48. FIG. 10B shows a front elevational view illustrating the arrangement of the solenoid 48. FIG. 10C shows a side elevational view illustrating the arrangement of the solenoid 48.

As shown in FIGS. 10A, 10B, 10C, the solenoid 48 includes a case 48a, a hollowly wound coil 48b contained in the case 48a, and the plunger 49 which is slidably inserted into the coil 48b. The plunger 49 has the engagement pins 49a projecting in the upward and downward directions perpendicular to the axis direction of the plunger 49 at an end portion of the plunger 49 projecting from the coil 48b.

When the solenoid 48 is energized in accordance with instructions given by the control circuit (not shown in the figures), the coil 48b is energized and attracts the plunger 49 in the C direction. The engagement pins 49a provided at the end portion of the plunger 49 engage with the first link 46A of the link mechanism 46. Therefore, when the solenoid 48 is energized and the plunger 49 is attracted in the C direction, the first link 46A of the link mechanism 46 rotates clockwise, that is, rotates in the carriage-movement-prevention releasing direction.

When the solenoid 48 is not energized because of the failure of the power supply or the like, the plunger 49 returns in the D direction due to the spring force of the torsion spring 47. At this time, the first link 46A rotates counterclockwise, that is, rotates in the carriage-movement-preventing direction. The stroke S of the plunger 49 of the solenoid 48 in the embodiment, which stroke is the range in which the plunger 49 can slide, is set to be small.

The stroke S which is the range in which the plunger can slide is so small that the attracting force of the coil 48b can effectively affect the plunger 49. Therefore, it is not necessary to increase the attracting force of the coil 48b so as to increase the range in which the plunger 49 can slide. As a result, it is possible to miniaturize the solenoid 48, and thereby, save a setting space.

In FIG. 2, a holding member 50 is formed of a sheet metal so that the guiding shaft 24, the link mechanism 46, the solenoid 48, and the torsion spring 47 are held from the top as a result of the holding member 50 being fixed to the frame 14.

In FIGS. 1, 2, a guiding-shaft pushing member 51 is fixed to the frame 14 in a condition in which an end portion of the guiding shaft 21 is pushed in the C direction perpendicular to the axis direction of the guiding shaft 21.

In a voice-coil motor 52, a magnet (not shown in the figure) is arranged on the frame 14, and a coil 53 is integrally provided on the left side surface of the head carriage 18. The voice-coil motor 52 is provided at the left side of the guiding shaft 21 which is disposed in proximity to the center of gravity of the head carriage 18. As a result, the head carriage 18 is driven in the A, B directions by the single voice-coil motor 52, and, thereby, the magnetic heads 16, 17 can perform a seeking operation. Therefore, in comparison to a case where a pair of voice-coil motors are provided on both sides of the head carriage, the head carriage is miniaturized, the moving space of the head carriage is reduced, and it is possible to miniaturize the magnetic disk device 11.

The arrangement of the head carriage 18 and the periphery thereof will now be described.

FIG. 11 shows a magnified plan view showing the head carriage 18 and the periphery thereof in an ejecting mode.

As shown in FIG. 11, the head arm 20 is supported rotatably in the upward and downward directions on a supporting stand 57 of the head carriage 18 via a leaf spring 58. The head arm 20 is pushed in the downward direction by a pushing portion 60a extending in the A direction from a torsion spring 60 which is wound around and hooked to a shaft 59 provided at a rear portion of the supporting stand 57.

Thereby, the projection 20a projecting laterally from the head arm 20 is pushed onto the top surface of the contact portion 25c of the lifter 25 by the spring force of the torsion spring 60. Because the engagement pin 25d projecting from the end portion of the lifter 25 engages with the V-shape recess portion 45c provided at the end portion of the carriage stopper 45, the lifter 25 rotates intermittently in response to a rotating operation of the carriage stopper 45, as will be described later.

Because the plunger 49 of the solenoid 48 is not attracted by electromagnetic force, the plunger 49 is moved in the D direction. Thereby, the first link 46A and the second link 46B of the link mechanism 46, engaging with the engagement pins 49a of the plunger 49, are maintained in the straightly extending condition as a result of being pulled by the torsion spring 47. As a result, the second link 46B pushes the connection pin 45d of the carriage stopper 45 in the C direction. Thereby, the rack 45b of the carriage stopper 45 engages with the movable rack 56 of the head carriage 18 and locks the head carriage 18.

Further, at a rear portion of the frame 14, an ejection detecting switch 54 which detects that the slider 13 has slid in the ejecting direction is provided. The ejection detecting switch 54 is caused to enter the closed condition as a result of being pushed by an end portion of the slider 13 which slides in the B direction as a result of the ejecting button 40 being pressed in the B direction.

The disk-cartridge loading operation of the above-described magnetic disk device 11 will now be described.

As shown in FIGS. 1 and 3, when the disk cartridge (not shown in the figures) is inserted into the disk holder 12 through the disk inserting hole 26 of the front bezel 27, the latch lever 38 is pushed and rotates clockwise. Then, when the movement-preventing portion 38b of the latch lever 38 thereby separates from the movement-to-be-prevented portion 13h of the slider 13, the slider 13, to which the force is applied by the coil spring 41, slides in the A direction.

As a result of the latch lever 38 rotating clockwise, the prevention of movement of the slider 13 is released as mentioned above, and also, the shutter of the disk cartridge is opened by the projecting end portion 38c of the lever portion 38a.

Both sides of the disk holder 12 are supported by the both side walls 14b, 14c of the frame 14 movably only in the upward and downward directions. As a result, when the slider 13 slides in the A direction, because the engagement pins 12e of the disk holder 12 are driven along the inclined cut-out portions 13d of the slider 13, the disk holder 12 falls from the cartridge insertion/ejection position to the cartridge loaded position.

Further, in the ejecting mode, the end portion of the slider 13, which portion extends in the B direction, is in contact with the ejection detecting switch 54, and causes the ejection detecting switch 54 to enter the closed condition. Thereby, the ejection detecting switch 54 outputs an ejection detection signal to the control circuit. Thereby, the solenoid 48 is de-energized, and, thereby, the plunger 49 moves in the D direction.

Further, in the ejecting mode, because the solenoid 48 is not energized, the first link 46A and the second link 46B of the link mechanism 46 are caused to extend straightly by the spring force Fa of the torsion spring 47. Thereby, the carriage stopper 45 is pushed in the direction toward the head carriage 18. As a result, the rack 45b is caused to engage with the movable rack 56 of the head carriage 18.

That is, the spring force Fa of the torsion spring 47 acts as the pushing force Fb by which the connection pin 45d of the carriage stopper 45 is pushed in the C direction, which engages with the fitting hole 46B$_3$ of the link mechanism 46.

The head carriage 18 is driven in the A, B directions by the voice-coil motor 52. Therefore, when no driving force is supplied by the voice-coil motor due to absence of power supply or the like, the head carriage 18 would freely move if nothing else prevents movement of the head carriage 18. However, in the ejecting mode, because the rack 45b of the carriage stopper 45 engages with the movable rack 56 of the head carriage 18, and, thereby, locks the head carriage 18, the head carriage 18 can be prevented from freely moving.

When, in any other mode, absence of power supply occurs, no driving force is supplied by the voice-coil motor 52. However, because also the solenoid 48 is de-energized, the head carriage 18 is locked, and the head carriage 18 can be prevented from freely moving.

Figure 12:
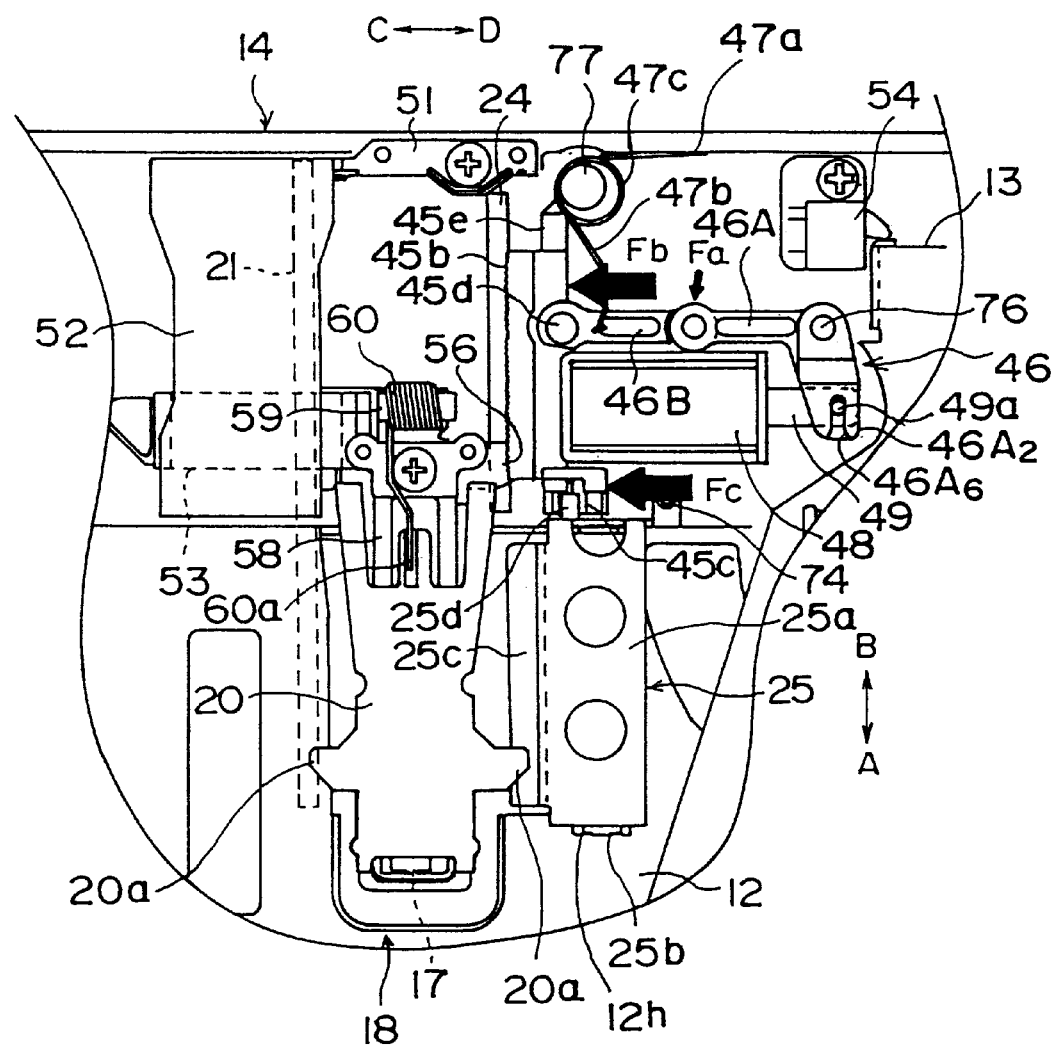
FIG. 12 shows a magnified plan view showing the head carriage and the periphery thereof in a waiting condition in a recording/reproducing mode.

FIG. 12 shows a magnified plan view showing the head carriage 18 and the periphery thereof in a waiting condition in the recording/reproducing mode.

As shown in FIG. 12, when the magnetic disk device 11 is in the waiting condition such as a stand-by condition, a sleep condition or the like in the recording/reproducing mode, the head carriage 18 does not perform the seeking operation. In this case, the solenoid 48 is de-energized. Thereby, similar to the case of the above-described ejecting mode shown in FIG. 11, the first link 46A and the second link 46B of the link mechanism 46 are caused to extend straightly by the spring force Fa of the torsion spring 47, and the carriage stopper 45 is pushed in the direction toward the head carriage 18. Thereby, the rack 45b engages with the movable rack 56 of the head carriage 18.

Thereby, in the waiting condition in the recording/reproducing mode, the head carriage 18 is locked so as to be prevented from moving in the A, B directions.

Figure 13:
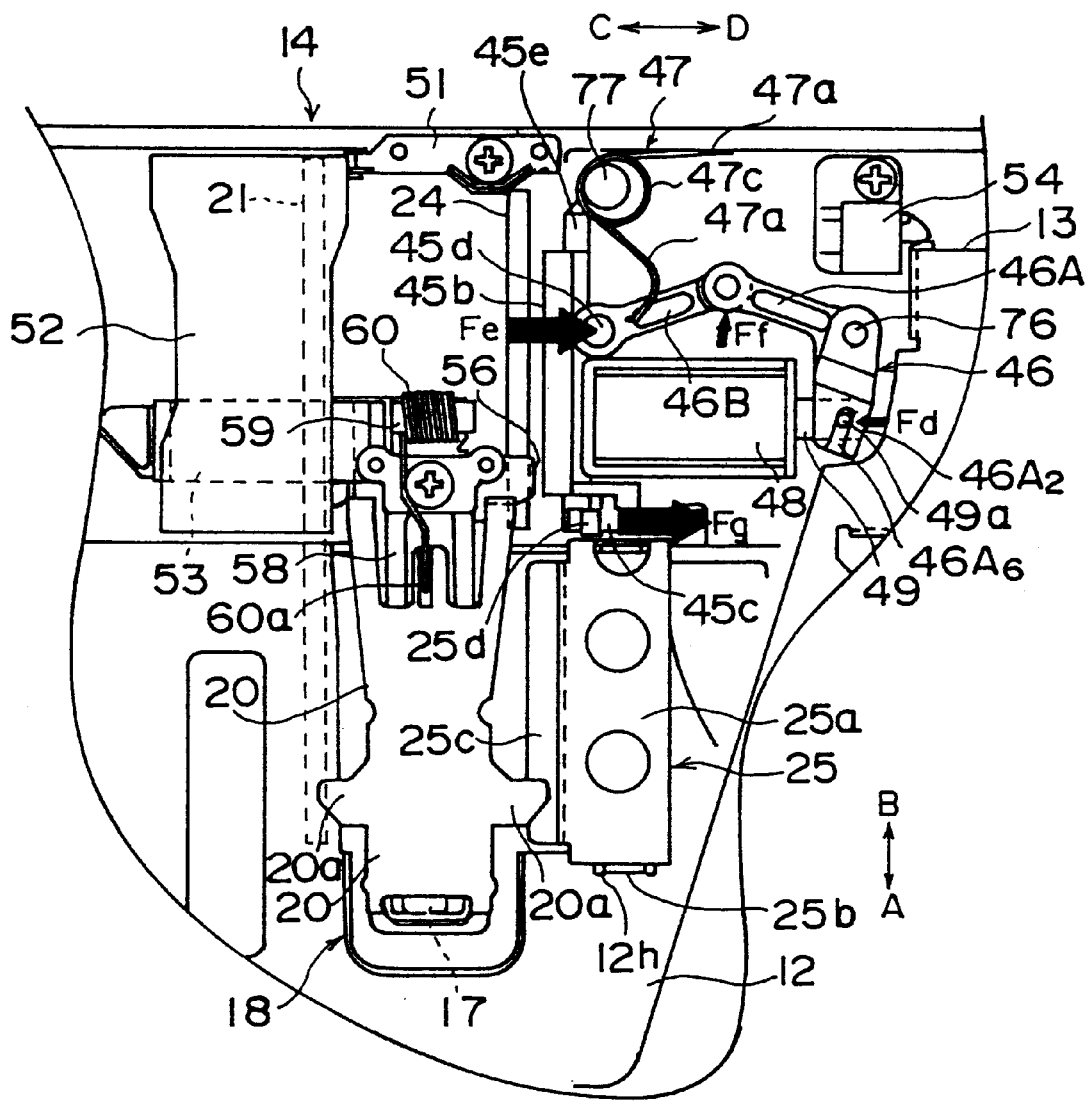
FIG. 13 shows a magnified plan view showing the head carriage and the periphery thereof in a case where a seeking operation is performed in the recording/reproducing mode.

FIG. 13 shows a magnified plan view showing the head carriage 18 and the periphery thereof in a case where the seeking operation is performed in the recording/reproducing mode.

As shown in FIG. 13, in this case, when the disk cartridge inserted into the disk holder 12 moves to the cartridge loaded position, a disk sensor (not shown in the figure) enters the ON condition, the rotation speed of the disk motor which drives the turntable 15 reaches a predetermined high speed, and, then, the solenoid 48 is energized.

Thus, in this case, the solenoid 48 is energized, and attracts the plunger 49 in the C direction. At this time, because the first link 46B of the link mechanism 46 is rotated clockwise, the attraction force of the solenoid 48 is increased, as will be described later.

Thus, the first link 46A and the second link 46B of the link mechanism 46 connected with the plunger 49 enter the bent condition, and the rack 45b of the carriage stopper 45 is caused to separate from the movable rack 56 of the head carriage 18. As a result, the locking of the head carriage 18 by the carriage stopper 45 is released.

Thereby, the head carriage 18 can perform the seeking operation, in radial directions (A, B directions) of the magnetic disk, by the driving force of the voice-coil motor 52. Thus, the magnetic heads 16, 17 can be caused to face desired tracks of the magnetic disk.

The plunger 49, which is attracted in the C direction as a result of the solenoid 48 being energized, engages with the engagement arm 46A$_2$ of the first link 46A which is rotatably supported by the shaft 76 on the frame 14. Therefore, the attraction force Fd of the solenoid 48 is converted into the torque Ff which rotates the first link 46A, and becomes the force Fe which pulls the connection pin 45d in the D direction. The attraction force Fd of the solenoid 48 is increased in the process in which the attraction force Fd of the solenoid 48 is converted into the torque Ff, by which the first link 46A is rotated clockwise, and, also, the second link 46B is rotated counterclockwise, and, as a result of the second link 46B rotating, the connection pin 45d is pulled by the pulling force Fe in the D direction. Further, the attraction force Fd of the solenoid 48 also acts as the pushing force Fg by which the V-shaped recess portion 45c of the carriage stopper 45 pushes the engagement pin 25d of the lifter 25 in the D direction.

Therefore, even when the attraction force Fd of the solenoid 48 is small, this force is increased through the link mechanism 46 and is transmitted to the carriage stopper 45 and the lifter 25. Accordingly, even when the solenoid 48 is a small one, a sufficient driving force can be obtained. Thereby, power consumption of the solenoid 48 can be reduced, and, also, a space required for setting the solenoid 48 is reduced so that the device can be miniaturized.

The operation of the head arm 20 in response to the operations of the above-described carriage stopper 45, the link mechanism 46, the torsion spring 47, and the solenoid 48 will now be described.

Figure 14A:
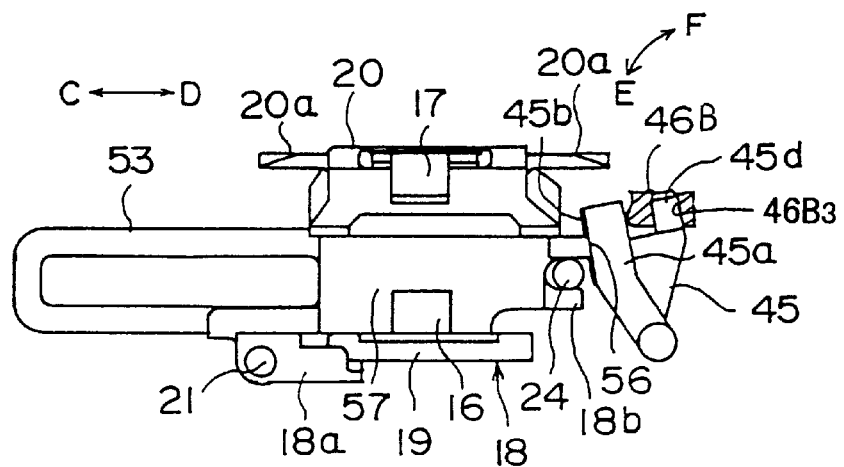
FIGS. 14A, 14B and 14C show front elevational views illustrating operation of a carriage stopper for the head carriage.
Figure 14B:
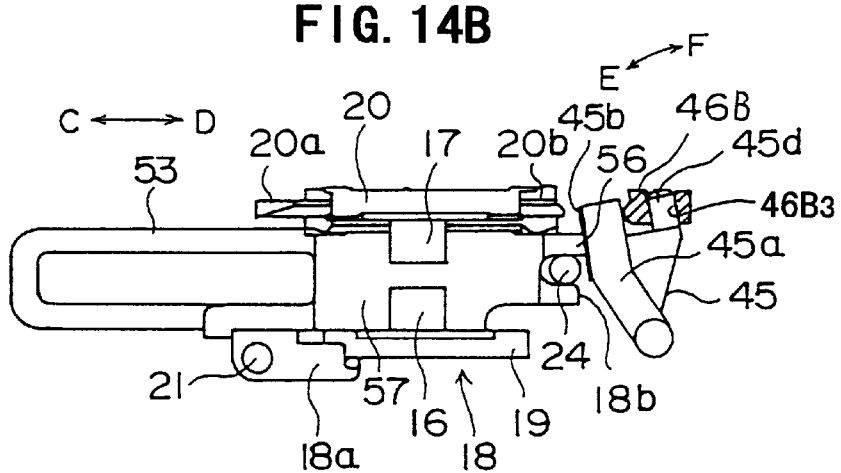
Figure 14C:
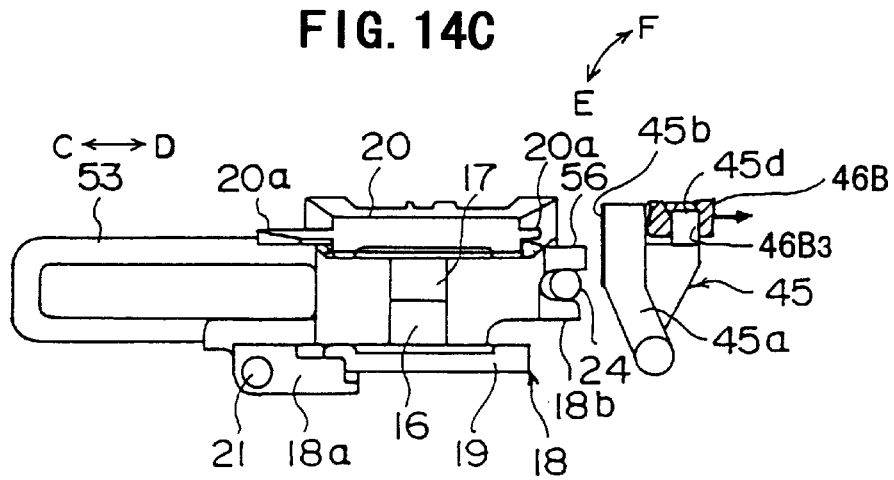

FIGS. 14A, 14B and 14C show front elevational views illustrating the operation of the carriage stopper 45 for the head carriage 18.

FIG. 14A shows the condition in the ejecting mode. The link mechanism 46 is pushed in the C direction by the spring force of the torsion spring 47. Thereby, the carriage stopper 45 rotates in the E direction by the spring force of the torsion spring 47, and the rack 45b engages with the movable rack 56 of the head carriage 18. Thus, the head carriage 18 is locked by the carriage stopper 45.

FIG. 14B shows the waiting condition in the recording/ reproducing mode. In this condition, similar to the case in the ejecting mode, the link mechanism 46 is pushed in the C direction by the spring force of the torsion spring 47. Thereby, the carriage stopper 45 rotates in the E direction by the spring force of the torsion spring 47, and the rack 45b engages with the movable rack 56 of the head carriage 18 so that the head carriage 18 is locked.

FIG. 14C shows the condition in the case where the seeking operation is performed in the recording/reproducing mode. In this condition, as described above, the solenoid 48 is energized, and the second link 46B of the link mechanism 46 is driven in the D direction. Thereby, the carriage stopper 45 rotates in the F direction by the driving force of the solenoid 48, the rack 45b separates from the movable rack 56 of the head carriage 18, and, thus, locking of the head carriage 18 by the carriage stopper 45 is released. Thereby, the head carriage 18 can perform the seeking operation in the A, B directions.

Figure 15A:
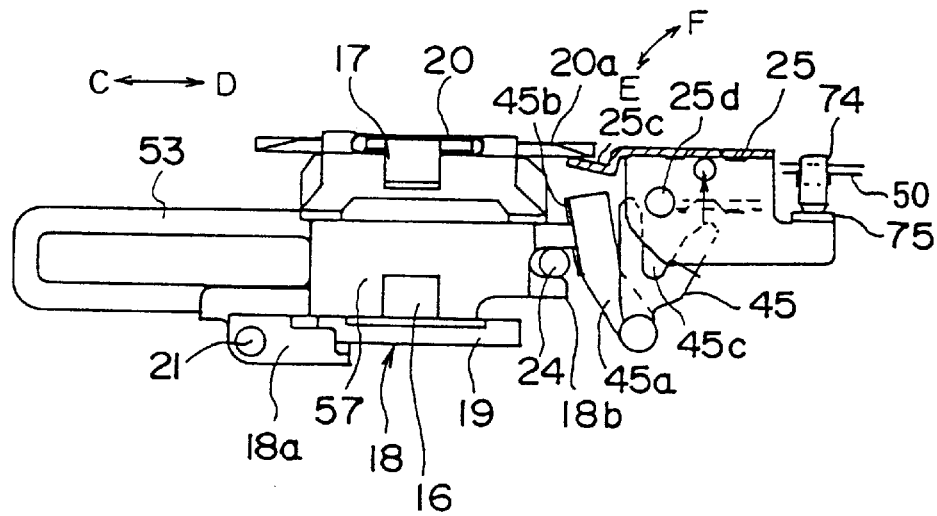
FIGS. 15A, 15B and 15C show front elevational views illustrating operations of the carriage stopper and a lifter for a head arm.
Figure 15B:
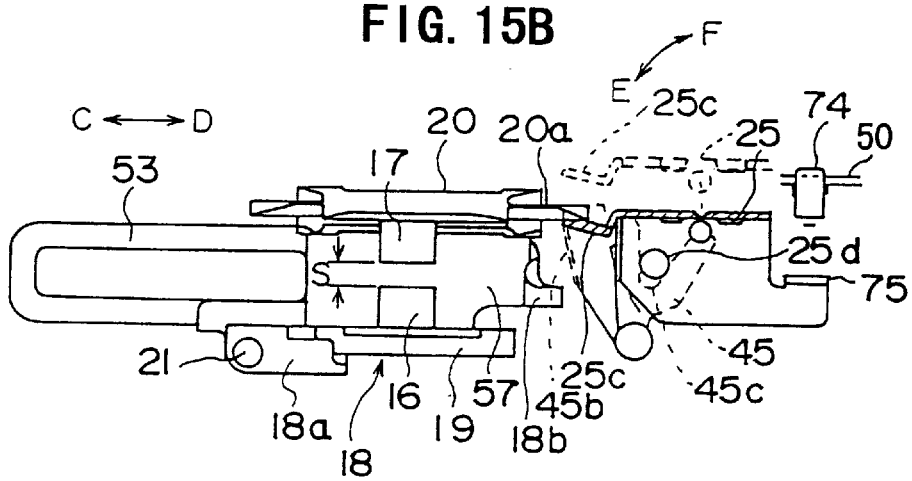
Figure 15C:
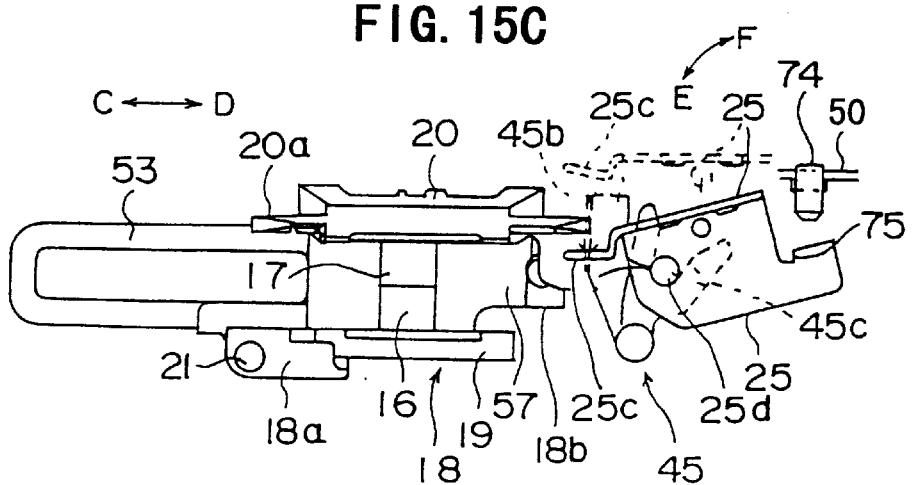

FIGS. 15A, 15B and 15C show front elevational views illustrating the operations of the carriage stopper 45 and the lifter 25 for the head arm 20.

FIG. 15A shows the condition in the ejecting mode. The carriage stopper 45 rotates in the E direction by the spring force of the torsion spring 47, and the rack 45b engages with the movable rack 56 of the head carriage 18. Further, because the disk holder 12 rises to the cartridge insertion/ ejection position, the lifter 25 also rises.

In the holding member 50, which is substantially fixed to the frame 14, an adjusting bolt 74 for adjusting the height of the lifter 25 is screwed. The bottom end of the adjusting bolt 74 comes into contact with a contact portion 75 which extends from the end of the lifter 25. Therefore, by changing the amount of screwing of the adjusting bolt 74 to the holding member 50, it is possible to adjust the amount of lifting of the lifter 25.

Further, in the process of lifting the disk holder 12 to the cartridge insertion/ejection position, the contact portion 75 provided integrally to the lifter 25 comes into contact with the bottom end of the adjusting bolt 74. The lifter 25 is supported on the top surface of the disk holder 12 rotatably in the E, F directions about the shafts 25b. Therefore, in response to the upward movement of the disk holder 12, the contact portion 75 extending rightward from the lifter 25 comes into contact with the bottom end of the adjusting bolt 74, and, thereby, the lifter 25 rotates in the F direction.

Further, the projection 20a projecting rightward from the head arm 20 is in contact with the contact portion 25c provided on the left side of the lifter 25. Therefore, when the lifter 25 rotates in the F direction in response to the upward movement of the disk holder 12, the projection 20a of the head arm 20 is lifted by the contact portion 25c. Thereby, the head arm 20 is maintained in the upward moved position in which the upper magnetic head 17 is apart from the lower magnetic head 16.

At this time, the engagement pin 25d of the lifter 25 is apart from the V-shape recess portion 45c of the carriage stopper 45.

FIG. 15B shows the waiting condition in the recording/ reproducing mode. In this condition, the head arm 20 temporarily stops at the intermediate position between the disk insertion/ejection position and the disk loaded position. At this time, in response to the falling movement of the disk holder 12, the engagement pin 25d projecting from the end portion of the lifter 25 in the B direction is inserted into the V-shaped recess portion 45c of the carriage stopper 45. Then, the engagement pin 25d of the lifter 25 is received by the V-shaped recess portion 45c of the carriage stopper 45, and comes into contact with the inclined portion of the V-shaped recess portion 45c.

Thus, the lifter 25 is stopped at the intermediate position midway from the disk insertion/ejection position to the disk loaded position. Therefore, the downward movement of the head arm 20 which moves together with the lifter 25 is temporarily stopped.

In this waiting condition, because the head arm 20 is stopped at the intermediate position before falling to the disk loaded position, the magnetic head 17 supported at the projecting end portion of the head arm 20 faces the magnetic head 16 supported at the projecting end portion of the carriage body 19 with a predetermined space S present therebetween. Thereby, the magnetic head 17 is located above the magnetic disk (not shown in the figure).

Further, the lower magnetic head 16 does not come into contact with the magnetic disk until the disk holder 12 falls to the cartridge loaded position. However, as a result of the disk holder 12 falling, the magnetic disk softly comes into contact with the lower magnetic head 16 due to the self- weight of the magnetic disk.

FIG. 15C shows the condition in the case where the seeking operation is performed in the recording/reproducing mode. In this condition, the solenoid 48 is energized and the link mechanism 46 is driven in the D direction, as described above. Thereby, the carriage stopper 45 rotates in the F direction by the driving force of the solenoid 48, and the rack 45b separates from the movable rack 56 of the head carriage 18. As a result, the locking of the head carriage 18 is released.

In response to the rotation of the carriage stopper 45 in the F direction, the V-shaped recess portion 45c of the carriage stopper 45 pushes the engagement pin 25d of the lifter 25 downward. Thereby, in response to the rotation of the carriage stopper 45 in the F direction, the lifter 25 rotates in the E direction, and the contact portion 25c of the lifter 25 falls.

Thereby, the head arm 20 falls. Accordingly, after stop- ping at the position in proximity to the magnetic disk (not shown in the figures) in the above-mentioned waiting condition, the upper magnetic head 17 supported by the head arm 20 comes into contact with the magnetic disk in response to the falling movement of the head arm 20 so that the upper magnetic head 17 and the lower magnetic head 16 come into contact with, and, thus, sandwich the magnetic disk.

Thus, the upper magnetic head 17 moves intermittently to the recording/reproducing position in which the upper mag- netic head 17 comes into contact with the magnetic disk. As a result, the shock applied to the magnetic disk, which rotates at high speed, by the magnetic head 17 can be eased. Thereby, the magnetic film formed on the surface of the magnetic disk can be prevented from being damaged.

The ejecting operation is the operation reverse to the above-described loading operation, and description thereof will be omitted.

Figure 16:
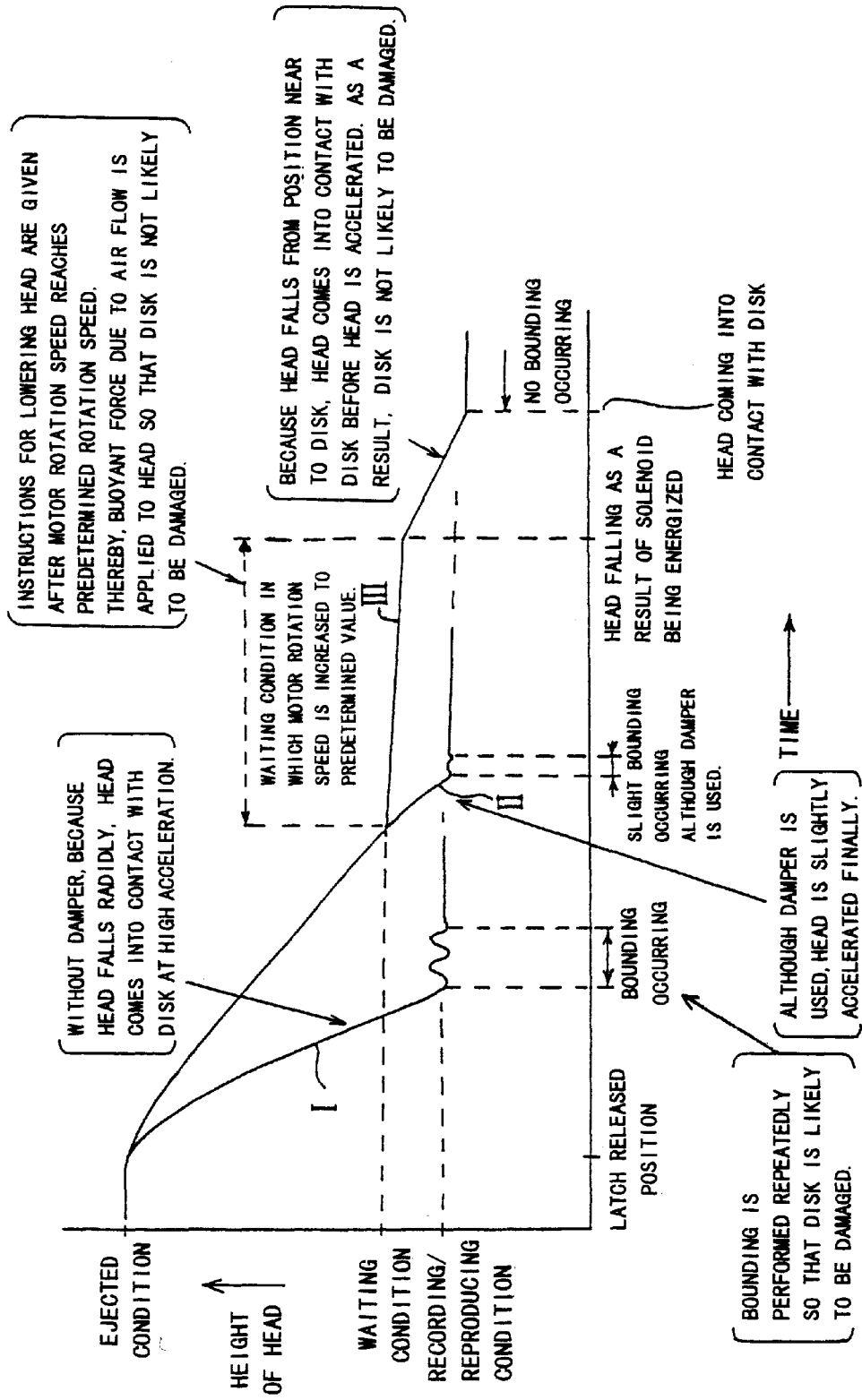
FIG. 16 shows results of experiments showing changes of the height of an upper magnetic head in a disk-cartridge loading operation.

FIG. 16 shows results of experiments showing changes of the height of the upper magnetic head 17. In FIG. 16, the curve I shows the characteristics of a device in the related art which does not use a damper. The curve II shows the characteristics of a device in the related art which uses a damper mechanism which decelerates the operation speed of the slider using a viscosity damper. The curve III shows the characteristics in the case where the head arm 20 falls stepwise as in the embodiment of the present invention.

When the curves I, II and III are compared with each other, it can be understood that there are the following differences:

In the case of the curve I where no damper is used, because the damper for decelerating the disk-cartridge loading operation is not provided, as a result of the sliding operation being performed by the slider, the disk holder and the head arm fall rapidly. Therefore, in the magnetic disk device which uses no damper, as a result of the disk-cartridge loading operation being performed, the upper magnetic head supported by the head arm rapidly falls, and pushes the magnetic disk onto the lower magnetic head.

As a result, due to the reaction force occurring when the upper magnetic head hits the lower magnetic head via the magnetic disk, the upper magnetic head bounds and hits the magnetic disk repeatedly. Thereby, the magnetic film formed on the surface of the magnetic disk is damaged.

In the case of the curve II where the damper is used, although the operation speed of the magnetic head is decelerated, because the disk holder and the head arm fall, at a stroke, from the disk (cartridge) insertion/ejection position to the disk (cartridge) loading position and the potential energy of the head arm is high, deceleration by the damper is not sufficient. Thereby, although the disk-cartridge loading operation is decelerated by the damper, the operation speed of the magnetic head is accelerated when the magnetic head comes into contact with the magnetic disk. Thus, in the magnetic disk device which uses the damper, although the falling speed of the magnetic head is decelerated in comparison to the case where no damper is used, because deceleration of the head arm is not sufficient, as a result of the upper magnetic head bounding when the upper magnetic head hits the lower magnetic head via the magnetic disk, the upper magnetic head hits the magnetic disk repeatedly. Thereby, there is a high possibility that the magnetic film formed on the surface of the magnetic disk is damaged.

In contrast to this, in the case where the operation speed of the slider 13 is decelerated by the mechanical damper mechanism 31, and, also, the falling operation of the head arm 20 is performed intermittently, according to the present invention, as indicated by the curve III shown in FIG. 16, it can be seen that the operation speed of the magnetic head 17 in the height direction changes stepwise and is the slowest.

In the case of the magnetic disk device 11 according to the present invention, the loading operations of the disk holder 12 and the head arm 20 are such that, as described above with reference to FIGS. 15A, 15B and 15C, in the waiting condition, the lifter 25 and the head arm 20 temporarily stop at the intermediate position between the disk insertion/ejection position and the disk loaded position.

In this waiting condition, while the magnetic head 17 supported at the extending end of the head arm 20 stops at the intermediate position in proximity to the magnetic head, the lower magnetic head 16 comes into contact with the magnetic disk because the disk holder 12 falls. However, because the magnetic disk comes into contact with the lower magnetic head 16 only due to the self-weight of the magnetic disk, the magnetic film of the magnetic disk is not damaged.

In this waiting condition, the rotation speed of the disk motor which drives the turntable 15 reaches a predetermined rotation speed. Then, the solenoid 48 is energized so that the locking of the head carriage 18 is released, and, simultaneously, the rotation operation of the lifter 25 starts and the falling operation of the head arm 20 restarts.

When the head arm 20 falls as a result of the lifter 25 rotating, the magnetic disk pushed by the upper magnetic head 17 instantaneously pushes the lower magnetic head 16. However, the acceleration, at which the magnetic head 17 moves from the intermediate position at which the magnetic head 17 stops to the position at which the magnetic head 17 comes into contact with the magnetic disk, is small. As a result, the shock applied to the lower magnetic head 16 when the upper magnetic head 17 comes into contact with the lower magnetic head 16 via the magnetic disk is reduced.

Thus, the magnetic head 17 comes into contact with the magnetic disk at a slow speed from the position at which the magnetic head 17 is in proximity to the magnetic disk. As a result, the magnetic head 17 does not bound when coming into contact with the magnetic disk, and, thereby, the magnetic film is positively prevented from being damaged.

Further, as is understood from the curve III, the falling operation of the head arm 20 temporarily stops in the waiting condition. Thereby, the speed at which the magnetic head 17 comes into contact with the magnetic disk is sufficiently reduced. Further, it is electrically detected that the rotation speed of the disk motor which drives the turntable 15 reaches the predetermined rotation speed in the waiting condition, and, then, the solenoid 48 is energized so that the magnetic head 17 is caused to fall. As a result, buoyant force occurring due to the air flow on the magnetic disk is applied to the magnetic head 17 when the magnetic head 17 comes into contact with the magnetic disk. Thereby, the shock applied to the magnetic disk when the magnetic head 17 comes into contact with the magnetic disk is eased.

Although the above-described embodiment is the magnetic disk device, the present invention can also be applied to, for example, an optical disk device, a magneto-optical disk device, a recording/reproducing device in which a card-shaped recording medium such as a memory card or the like is loaded, and so forth.

Further, although the slider slides above the disk holder in the above-described embodiment, the present invention can also be applied to an arrangement in which the slider slides below the disk holder.

The present invention is not limited to the above-described embodiment, and variations and modifications may be made without departing from the scope of the present invention.

The contents of the basic Japanese Patent Application No. 10-045717, filed on Feb. 26, 1998, are hereby incorporated by reference.

What is claimed is:

1. A recording/reproducing device operable in a recording/reproducing mode for receiving a recording medium for recording/reproducing purposes and an ejecting mode for ejecting said recording medium, said device comprising:

a frame on which said device is arranged;

a head carriage movably mounted on said frame and supporting a head for recording information onto said recording medium and reproducing information from said medium, said head carriage having an engagement portion;

a locking member mounted on said frame and movable between a locking position at which said locking member engages said engagement portion of said head carriage to prevent movement of said bead carriage and an unlocking position at which said locking member is disengaged from said engagement portion to permit movement of said head carriage;

a driving unit mounted on said frame for driving said locking member between it locking and unlocking positions;

a substantially L-shaped first link member rotatably mounted on said frame, said first link member having a first end portion coupled to said driving unit and having a second end portion;

a second link member mounted on said frame and having a first end portion coupled to said second end portion of said first link member and having a second end portion coupled to said locking member so that when said locking member is in said locking position, said second end portion of said first link member and said second link member are aligned in a straight line so as to be irreversibly prevented from movement if a shock is applied to said locking member, thereby preventing movement of said head carriage; and a force-applying member which applies force to said locking member to urge said locking member towards said locking position whereby when said recording medium is inserted into said device for recording/reproducing purposes, said device changes from its ejecting mode to its recording/reproducing mode in which said head carriage is released from said locking member to permit said head carriage to move and cause said head to approach said recording medium.

2. The recording/reproducing device as claimed in claim 1, wherein:

said driving unit comprises a solenoid which includes a plunger;

said plunger is driven by said solenoid when said solenoid is energized;

said plunger is connected with said first end portion of said first link member; and energizing of said solenoid is stopped in said ejecting mode of said device.

3. The recording/reproducing device as claimed in claim 2, wherein:

said first link member and said second link member are rotatably connected with one another;

said first end portion of said first link member is rotatably connected with said plunger of said solenoid; and said second end portion of said second link member is rotatably connected with said locking member, wherein, when said solenoid is energized and drives said plunger, said plunger is moved in a predetermined direction against the force applied by said force-applying member, thereby said first link member is rotated and pulls said second link member, and thereby said second link member is rotated and pulls said locking member so as to cause said locking member to move to said unlocking position.

4. The recording/reproducing device as claimed in claim 1, wherein said force-applying member apples a force to said second link member such that said second end portion of said first link member and said second link member are aligned when said driving unit does not drive said first end portion of said first link member.

5. A device as claimed in claim 1 wherein said first end portion and said second end portion of said first link member intersect at a substantially right angle to each other to form said L-shape and said first link member is rotatable about the intersection of said first and second end portions thereof.

6. The recording/reproducing device as claimed in claim 1, wherein said recording medium is substantially disc-shaped and said head carriage is movable in a radial direction of said recording medium and wherein said locking member can lock said head carriage wherever said head carriage is located after moving in the radial direction of the recording medium.

* * * * *